US006254103B1

(12) United States Patent
Cooke

(10) Patent No.: US 6,254,103 B1
(45) Date of Patent: Jul. 3, 2001

(54) SEAL

(75) Inventor: Michael Peter Cooke, Gillingham (GB)

(73) Assignee: Lucas Industries (GB)

( * ) Notice: Subject to any disclaimer, the term of this patent is extended or adjusted under 35 U.S.C. 154(b) by 0 days.

(21) Appl. No.: 09/361,822

(22) Filed: Jul. 27, 1999

(30) Foreign Application Priority Data

Aug. 7, 1998 (GB) ................................................ 9817128

(51) Int. Cl.[7] ........................................................ F16J 9/00

(52) U.S. Cl. .......................... 277/435; 277/437; 277/460; 277/502; 277/578

(58) Field of Search .................................... 277/435, 436, 277/437, 459, 460, 467, 477, 490, 493, 909, 543, 544, 578, 502

(56) References Cited

U.S. PATENT DOCUMENTS

| | | | | |
|---|---|---|---|---|
| 603,736 | * | 5/1898 | Prendergast . | |
| 1,179,333 | * | 4/1916 | Obertop | 277/293 |
| 1,654,736 | * | 1/1928 | Kistner | 277/467 |
| 1,752,848 | * | 4/1930 | Howard | 277/493 |
| 1,856,961 | * | 5/1932 | Madsen . | |
| 1,965,294 | * | 7/1934 | Marshall | 277/460 |
| 1,967,573 | * | 7/1934 | Fox | 277/544 |
| 2,545,531 | * | 3/1951 | Sands | 141/357 |
| 2,766,085 | * | 10/1956 | Muller | 277/467 |
| 2,877,071 | * | 3/1959 | Arnot | 277/468 |
| 3,235,274 | * | 2/1966 | Cain et al. . | |
| 3,390,889 | * | 7/1968 | Grover | 277/440 |
| 3,455,565 | * | 7/1969 | Jepsen | 277/497 |
| 3,490,774 | * | 1/1970 | Henry et al. | 277/543 |
| 3,582,093 | * | 6/1971 | Lucien | 277/434 |
| 3,897,072 | * | 7/1975 | Inka et al. | 277/459 |
| 3,963,014 | * | 6/1976 | Staudt et al. | 277/637 |
| 5,113,747 | * | 5/1992 | Pignerol | 92/175 |
| 5,669,355 | * | 9/1997 | Gibson et al. | 123/446 |
| 5,921,553 | * | 7/1999 | Klein | 277/492 |

* cited by examiner

*Primary Examiner*—Anthony Knight
*Assistant Examiner*—Alison K. Pickard
(74) *Attorney, Agent, or Firm*—Michael Best & Friedrich LLP

(57) ABSTRACT

A seal comprises a support member having an outer periphery of substantially circular form, and a resilient seal member mounted upon the support member, the seal member, when occupying a relaxed condition, having an outer periphery of generally circular form and a diameter greater than that of the support member, the seal member and support member being eccentric to one another when the seal member occupies the relaxed condition, the seal member being compressible towards a compressed condition in which the seal member and the support member are of substantially equal diameter and are substantially coaxial.

11 Claims, 9 Drawing Sheets

SEAL

FIELD OF THE INVENTION

This invention relates to a seal, and in particular to a seal capable of withstanding high pressures and suitable for use in the fuel supply system for a compression ignition internal combustion engine.

BACKGROUND OF THE INVENTION

In the fuel system for a compression ignition internal combustion engine, very high fuel pressures are commonly encountered. For example, in a fuel system of the common rail type, the fuel pressure within the common rail may be around 2000 bar. Clearly, in order to achieve such a pressure, and in order to optimise efficiency it is important to restrict leakage from the various parts of the fuel system, for example the fuel pump and the fuel injectors, to a very low level. In particular, at such high pressures, the fuel pressure within bores formed in the components used in the fuel system may dilate and as a result, the clearance between the walls of the bores and any members slidable within the bores may increase giving rise to increased leakage.

SUMMARY OF THE INVENTION

It is an object of the invention to provide a seal suitable for use in a variety of fuel system applications whereby leakage of fuel can be restricted to an acceptable level even when the fuel system is to be operated at high fuel pressures.

According to the present invention there is provided a seal comprising a support member having an outer periphery of substantially circular form, and a resilient seal member mounted upon the support member, the seal member, when occupying a relaxed condition, having an outer periphery of generally circular form and a diameter greater than that of the support member, the seal member and support member being eccentric to one another when the seal member occupies the relaxed condition, the seal member being compressible towards a compressed condition in which the seal member and the support member are of substantially equal diameter and are substantially coaxial.

The seal member may include a region of split ring like form.

The seal may further include a cover member, the seal member being located between the support member and the cover member.

According to another aspect of the invention there is provided a high pressure fuel pump comprising a pumping plunger reciprocable within a bore under the influence of a cam arrangement, and a seal of the type defined hereinbefore carried by the pumping plunger, the seal member of the seal engaging the wall of the bore, the seal being arranged to substantially prevent fuel from flowing between the pumping plunger and the wall of the bore when the pumping plunger moves in a first direction.

According to a further aspect of the invention there is provided a fuel injector comprising a valve needle slidable within a bore, a surface associated with the needle being subject to the fluid pressure within a control chamber defined, in part, by a piston slidable within a bore, and a seal of the type defined hereinbefore associated with the piston to restrict the escape of fluid from the control chamber between the piston and the bore within which the piston is slidable.

According to another aspect of the invention there is provided a fuel injector comprising a valve needle slidable within a bore, the needle carrying a seal of the type defined hereinbefore located so as to restrict leakage between the needle and the wall of the bore.

Where the injector is of the outwardly opening type, an additional seal of the type defined hereinbefore may be provided.

In each of the applications described hereinbefore, the use of the seal is advantageous in that leakage of fuel or another fluid at high pressure can be restricted to an acceptable level. The resilience of the seal member is sufficient to ensure that leakage is restricted to an acceptable level even if dilation of the bore within which the seal is located occurs, in use. It will further be appreciated that by using such a separate seal, components slidable within bores, in use, do not need to be machined to the same level of accuracy as in prior, arrangements in which the fit of the components within the bores governs the level of leakage.

According to another aspect of the invention there is provided a method of manufacturing a seal comprising the steps of securing a seal member having a substantially circular periphery to a support member having a substantially circular periphery such that the seal and support members are substantially coaxial, and deforming the seal member to increase its diameter such that the seal member is eccentric to the support member after deformation.

A step of grinding the seal may be performed prior to the step of deforming the seal member.

The seal member may be provided with an arcuate slot, the step of deforming the seal member including the step of fracturing the seal member radially outwardly of the slot. This may be achieved by applying fluid under pressure to the slot.

BRIEF DESCRIPTION OF THE DRAWINGS

The invention will further be described, by way of example, with reference to the accompanying drawings, in which.

DETAILED DESCRIPTION

Figure 1A:
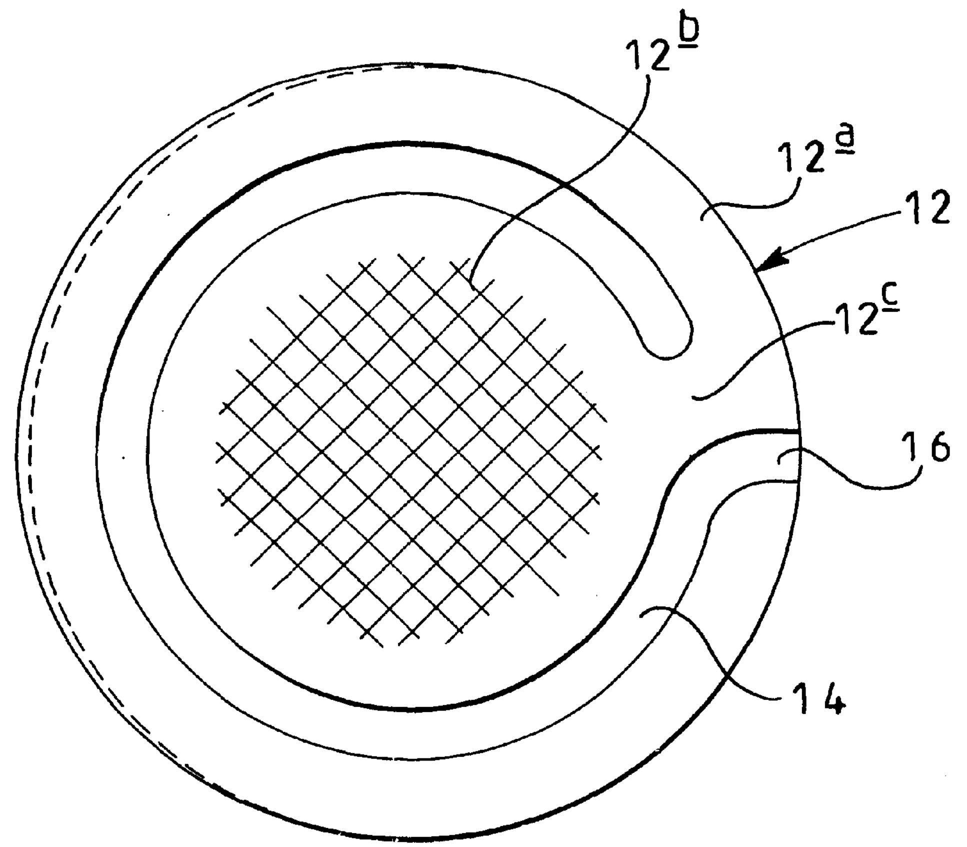
FIGS. 1*a* and 1*b* are plan and sectional views of a seal in accordance with an embodiment of the invention, in it relaxed condition.

The seal illustrated in FIGS. 1*a*, 1*b*, 2*a* and 2*b* comprises a support member 10 of substantially circular form, the diameter of which is slightly smaller than the diameter of the bore or drilling within which a substantially fluid tight seal is to be formed, in use. A seal member 12 is secured to the upper surface of the support member 10, the seal member 12 comprising a member of circular form, the diameter of which is slightly greater than the diameter of the bore within which a substantially fluid tight seal is to be formed. The seal member 12 is provided with a part-circular slot 14 opening into a slot 16 which extends across an outer part of the diameter of the seal member 12. The provision of the slots 14, 16 in the seal member 12 result in the seal member 12 having an outer region 12*a* which is effectively of split ring like form, the outer region 12*a* being integrally formed with an inner region 12*b*of substantially circular form through a connecting region 12*c* located between the ends of the slot 14.

Figure 1B:
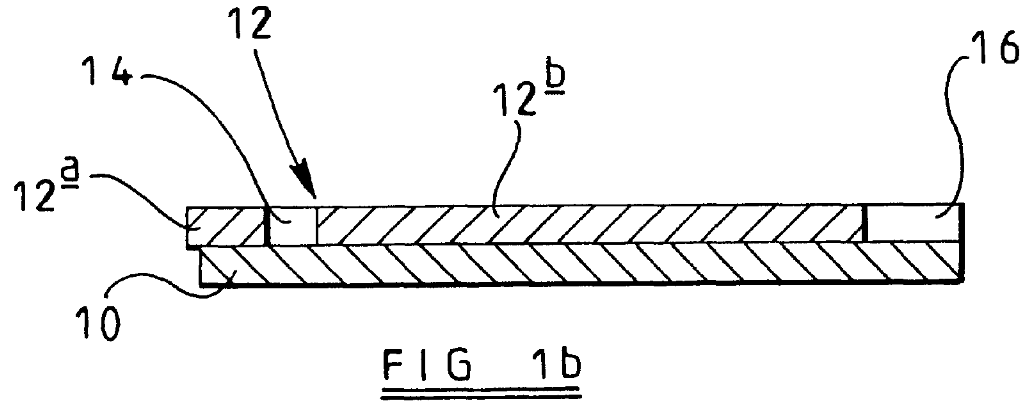

As illustrated in FIGS. 1*a* and 1*b*, when the seal member 12 is in its relaxed condition, the diameter thereof is greater than that of the support member 10, and the axis of the seal member is offset from the axis of the support member 10 with the result that the edge of the seal member 12 at the point at which the slot 16 opens into the exterior periphery of the seal member 12 is aligned with the edge of the support member 10.

As denoted by the hatched region in FIG. 1*a*, the region 12*b* of the seal member 12 is secured to the support member 10. The support member 10 and seal member 12 are conveniently constructed from a resilient material, for example spring steel or phosphor bronze, and are conveniently secured to one another using a resistance welding technique, but it will be appreciated that alternative materials can be used, and that the support member and seal member may be secured to one another using an alternative technique.

Figure 2A:
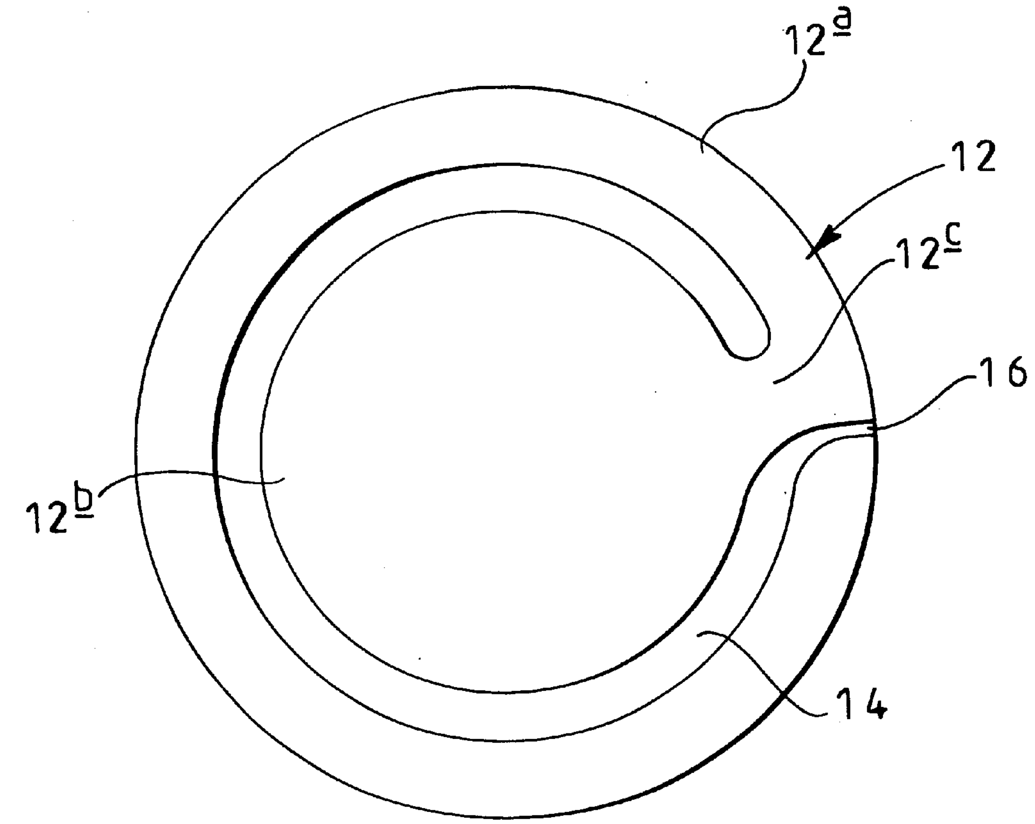
FIGS. 2*a* and 2*b* are views similar to FIGS. 1*a* and 1*b* showing the seal in its compressed condition.
Figure 2B:
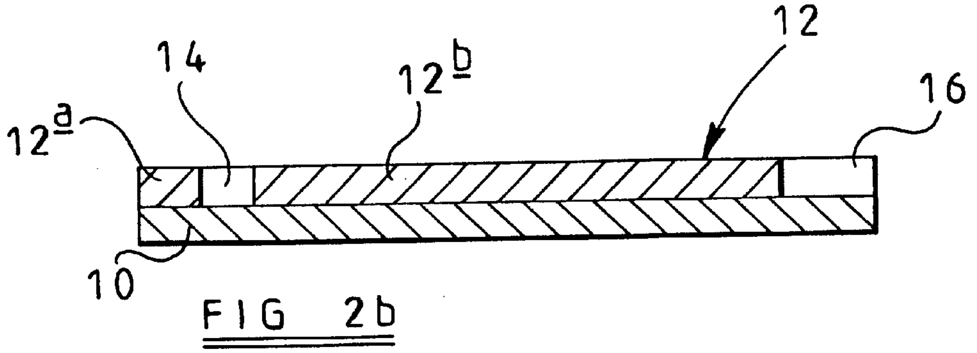

As illustrated in FIGS. 2*a* and 2*b*, when a compressive force is applied to the seal member 12 as occurs in use, the outer region 12*a* thereof is compressed, reducing the outer diameter of the seal member 12 to substantially than that of the support member 10, the outer region 12*a* of the seal member 12 flexing to reduce the widths of the slots 14, 16. It will be appreciated that as the region of the seal member 12 at the point at which the slot 16 opens to the periphery of the seal member 12 is aligned with the edge of the support member 10, and as in this condition, the seal member 12 is of substantially equal diameter to the support member 10, then in this condition, the support member 10 and seal member 12 are substantially coaxial.

In use, the seal is located within a bore within which a substantially fluid tight seal is to be formed, the introduction of the seal requiring compression of the seal member 12. Once in position within the bore, the resilience of the seal member causes the outer surface thereof to engage the wall of the bore in a substantially fluid tight manner. As the part of the seal member 12 within which the slot 16 is formed is aligned with the support member 10, the support member 10 closes the slot 16, thus avoiding leakage of fluid past the seal through the slot 16.

The seal is free to move within the bore, in use, thus the seal can be mounted upon or carried by a component slidable within the bore. The resilience of the seal can compensate for slight manufacturing inaccuracies and for dilation of the bore, in use. The resilience of the seal can further compensate for slight inaccuracies in the positioning of the seal thus, if the component carrying the seal is machined in such a manner that, in use, the seal is tilted slightly relative to the axis of the bore, a substantially fluid tight seal can still be achieved.

Figure 3A:
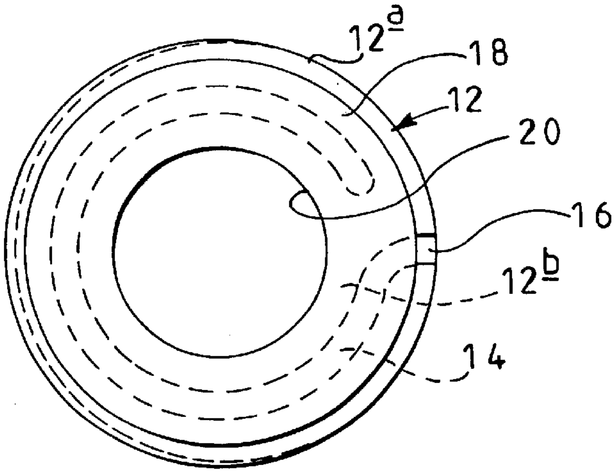
FIGS. 3*a*, 3*b*, 4*a*, 4*b*, 5*a* and 5*b* are views similar to FIGS. 1*a* and 1*b* illustrating three alternative embodiments.
Figure 3B:
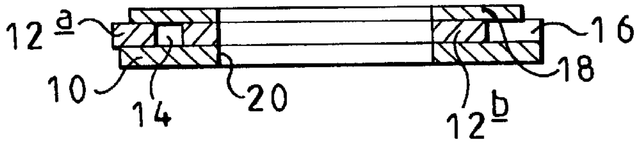

FIGS. 3*a* and 3*b* illustrate a modification to the arrangement described hereinbefore in which a cover member 18 is secured to the surface of the seal member 12 remote from the support member 10. The cover member 18 is of diameter smaller than that of the support member 10, the support member 10 and cover member 18 being substantially coaxial with one another. The cover member 18 is secured to the central part 12*b* of the seal member 12, for example using a resistance welding technique. The support member 10, central part 12*b* of the seal member 12 and cover member 18 are each shaped to define an opening 20 extending through the seal, through which a component carrying the seal extends, in use.

The provision of a cover member is advantageous in that the seal member is supported for movement in either direction within the bore, in use.

Figure 4A:
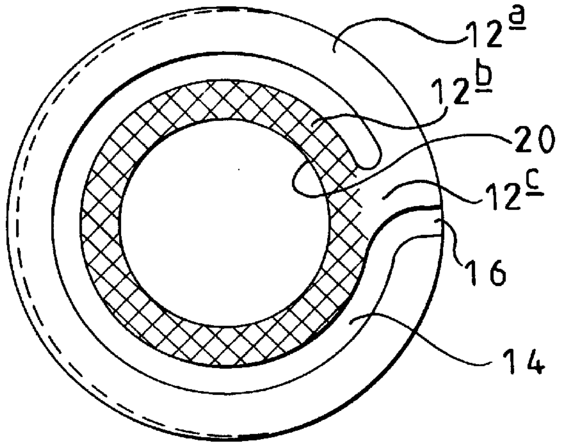
Figure 4B:
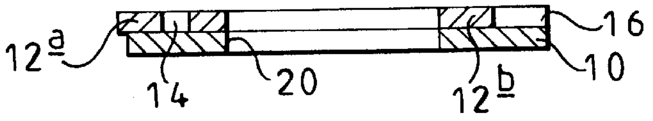

The arrangement illustrated in FIGS. 4*a* and 4*b* is similar to that of FIGS. 3*a* and 3*b* but in which the cover member 18 is omitted. As described with reference to FIGS. 3*a* and 3*b*, the central part 12*b* of the seal member 12 and the support member 10 are shaped to define an opening 20 extending through the seal.

Figure 5A:
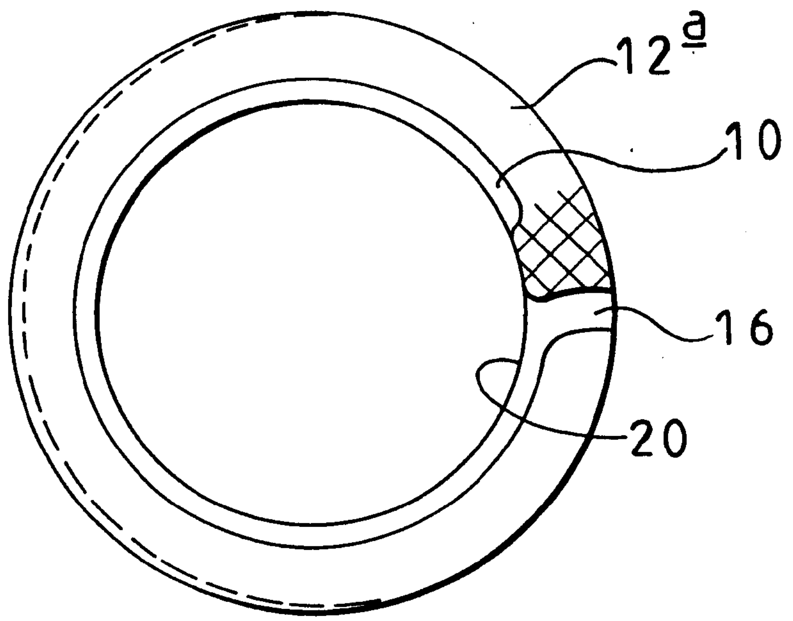
Figure 5B:
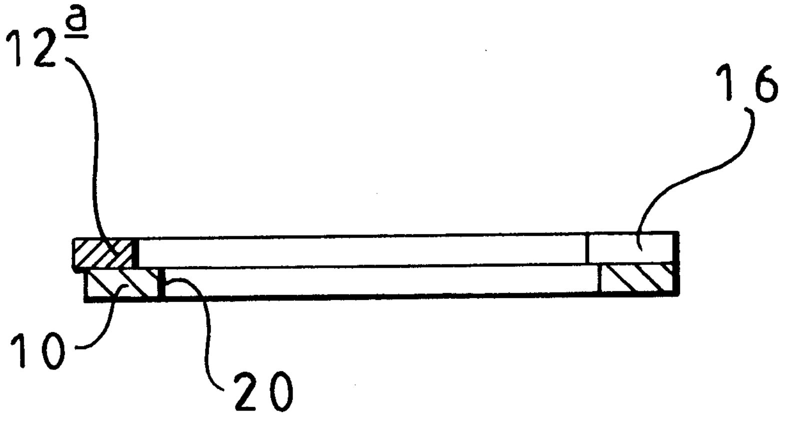

FIGS. 5*a* and 5*b* illustrate a further modification in which the seal member 12 is of split annular form, in effect the seal member 12 being shaped to omit the provision of the inner region 12*b*. In the embodiments described hereinbefore, the seal member 12 and support member 10 have been secured to one another by securing the inner region 12*b* to the support member 10. As the arrangement of FIGS. 5*a* and 5*b* does not include such an inner region 12*b*, clearly this approach cannot be taken and instead a part of the outer region 12*b* of the support member 12 adjacent the slot 16 thereof is secured to the support member 10. As in the arrangements described hereinbefore, the positioning of the seal member 12 relative to the support member 10 is such that the slot 16 opens into the periphery of the seal member 12 at a position aligned with the edge of the support member 10.

The arrangement of FIGS. 5*a* and 5*b* is particularly suitable where a relatively large diameter member or component is to be received within the opening 20 extending through the seal as the diameter of the opening 20 can be increased without increasing the outer diameter of the seal.

In each of the seals described hereinbefore, the slot 16 which extends to the periphery of the seal member 12 is located so as to be aligned with the edge of the support member 10. As a result, the support member 10 acts to mask the slot 16 which forms the split of the split ring defined by the outer region 12*a* of the seal member 12. As a result, even if the width of the slot 16 varies, in use, the leakage remains at a small level. Manufacturing inaccuracies in producing the bores within which the seals are slidable, in use, can be compensated for by expansion or compression of the seal member 12, in use, thus the use of the invention is advantageous in that manufacturing tolerances can be compensated for, and variations in the dimensions of bores, for example resulting from thermal expansion or contraction or due to dilation of bores due to the fuel pressures therein can be compensated for.

Figure 6:
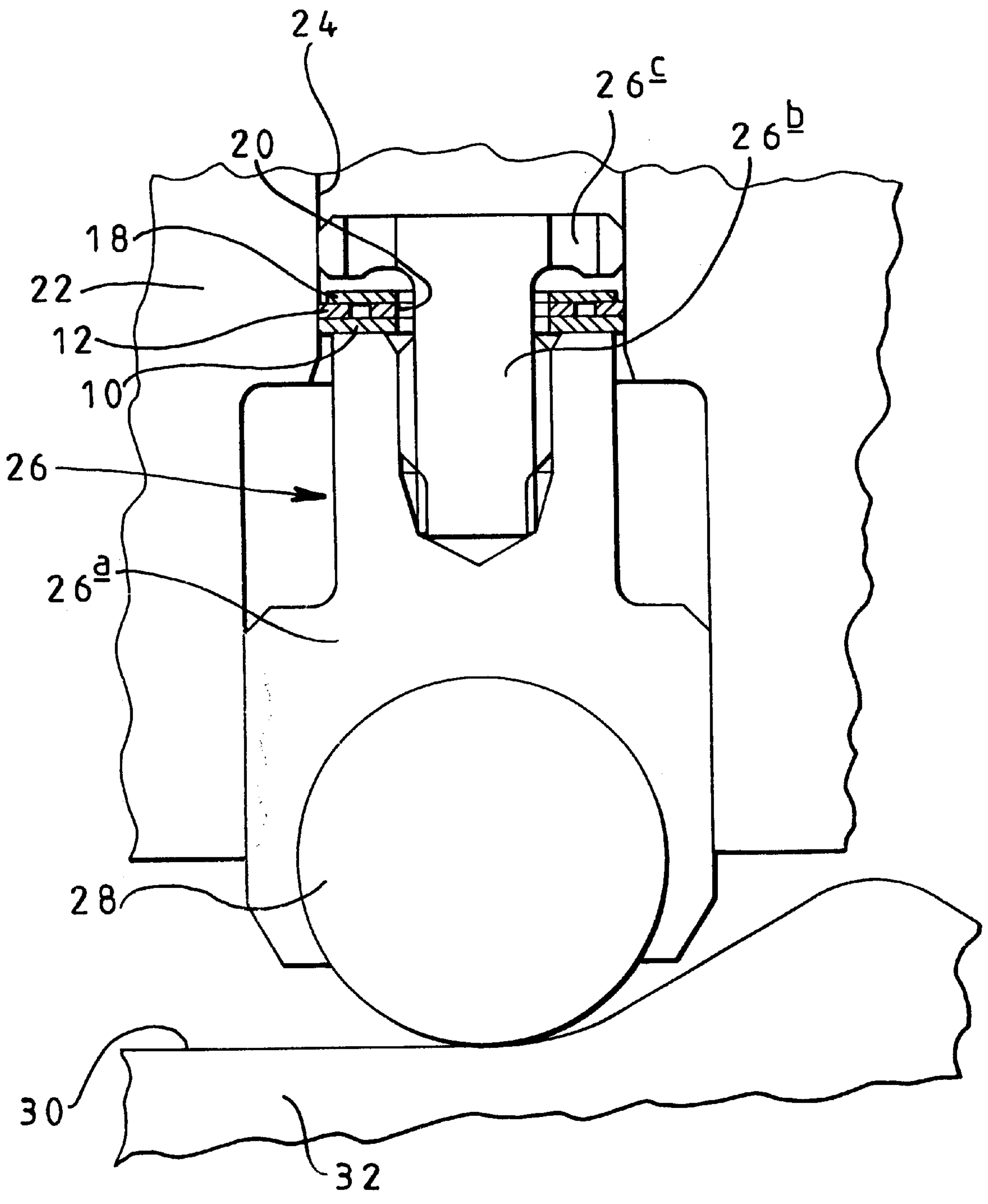
FIG. 6 is a view illustrating part of a fuel pump which incorporates the seal of FIGS. 3*a* and 3*b;*

FIG. 6 illustrates a pump arrangement incorporating a seal of the type described hereinbefore with reference to FIGS. 3*a* and 3*b*. The pump arrangement illustrated in FIG. 6 comprises a housing 22 defining a plunger bore 24 within which a pumping plunger arrangement 26 is reciprocable. The pumping plunger arrangement 26 includes a cam follower member in the form of a roller 28 which is engageable with a cam surface 30 formed on a cam ring 32 such that as the housing 22 moves relative to the cam ring 32, the roller 28 rides over cam lobes forming part of the cam surface 30 causing the plunger arrangement 26 to reciprocate within the bore 24.

As illustrated in FIG. 6, the plunger arrangement 26 includes a shoe member 26*a* which includes a screw-threaded drilling within which a member 26*b* is located, the shoe member 26*a* and member 26*b* together holding captive a seal of the type described hereinbefore with reference to FIGS. 3*a*and 3*b*. The opening 20 of the seal is of diameter greater than the diameter of the adjacent part of the member 26*b* thus fuel is able to flow through the opening 20, in use, and the member 26*b* is provided with drillings 26*c* to permit fuel to flow past the member 26*b*.

In the position illustrated, the plunger arrangement 26 occupies its outermost position, the bore 24 being charged with fuel at relatively low pressure. As illustrated, the support member 10 of the seal seats against the inner end of the shoe member 26*a*, and the seal member 12 engages the surface of the bore 24. As a result, a substantially fluid tight seal is formed between the bore 24 and the shoe member 26*a*.

Movement of the housing 22 relative to the cam ring 32 causes the roller 28 to ride over the cam surface 30 with the result that the plunger arrangement 26 is pushed inwardly, compressing the fuel within the bore 24 to a high pressure.

After the plunger arrangement 26 has completed inward movement, outward movement of the plunger arrangement 26 takes place, for example under the influence of a return spring (not shown). During such outward movement, the seal is permitted to lift from the inner end of the shoe member 26*a*, thus breaking the fluid tight seal between the wall of the bore 24 and the shoe member 26*a*, and fuel is permitted to flow through the drillings 26*c*, and through the opening 20 of the seal, the fuel subsequently flowing between the seal and the shoe member 26*a*.

Although the description hereinbefore is of the use of the seal in an arrangement in which fuel is not permitted to flow past the seal during inward movement of the plunger arrangement 26, but is permitted to flow past the seal during outward movement of the plunger arrangement 26, it will be appreciated that the seal could be used in an arrangement in which fuel is not permitted to flow past the seal during movement of the plunger arrangement 26 in either direction.

Figure 7:
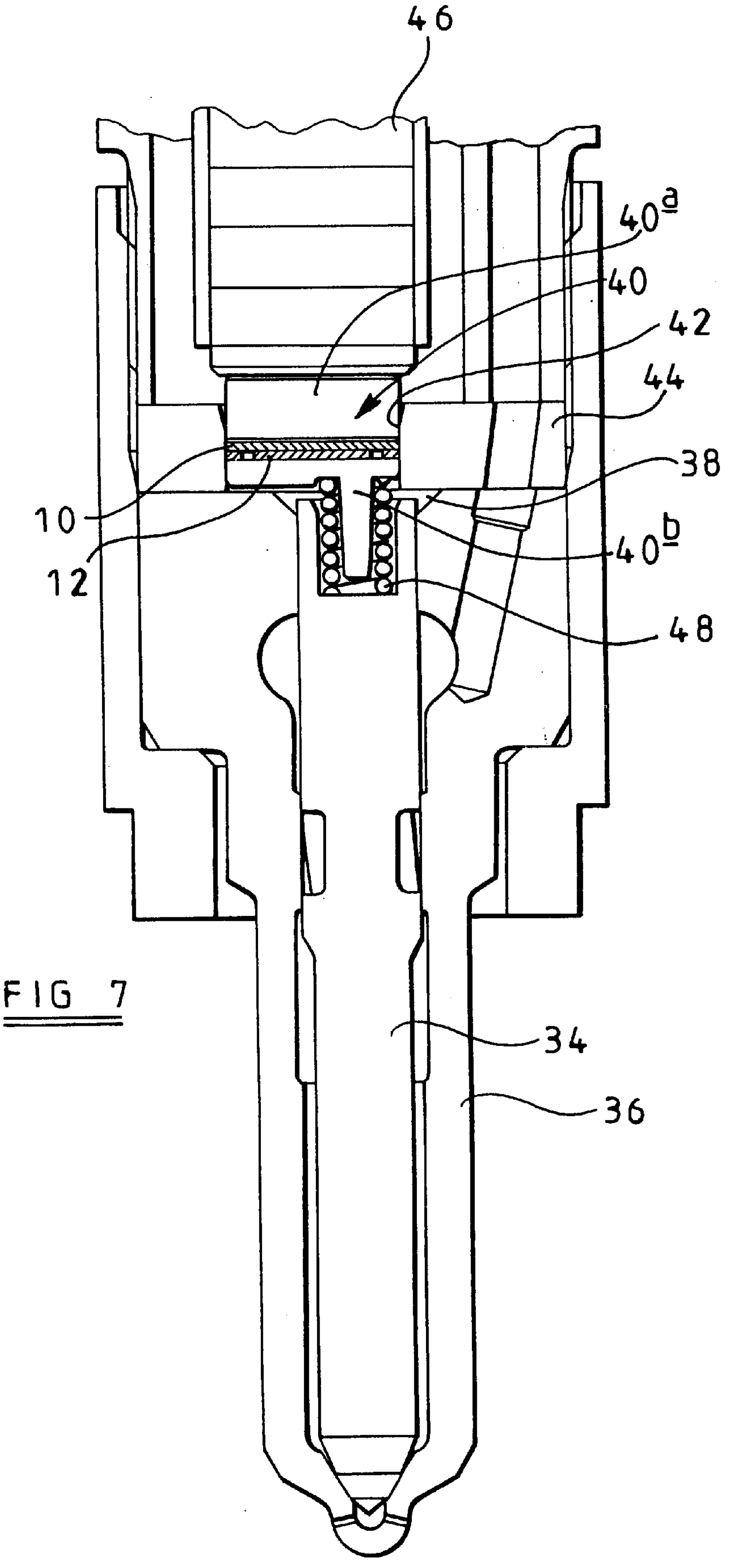
FIG. 7 is a view illustrating part of a fuel injector which incorporates the seal of FIGS. 1*a* and 1*b;*

FIG. 7 illustrates an alternative application of a seal in accordance with the invention. FIG. 7 illustrates a fuel injector which comprises a needle 34 slidable within a bore formed in a nozzle body 36. The needle 34 is biased into engagement with a seating by means of a spring 48 and by the force applied to an upper end surface of the needle 34, in the orientation illustrated, by the pressure of fluid within a control chamber 38. The needle 34 is shaped to include thrust surfaces angled such that the application of fuel under pressure thereto, in use, applies a force to the needle 34 urging the needle 34 away from its seating against the action of the spring 48 and the fluid pressure within the control chamber 38.

The fluid pressure within the control chamber 38 is controlled by means of a piston 40 which is slidable within a bore 42 formed in a distance piece 44. The piston 40 is moveable under the influence of a piezoelectric actuator arrangement 46, and against the action of the spring 48 to control the fluid pressure within the control chamber 38, the spring 48 being engaged between the piston 40 and the needle 34.

The piston 40 is of two-part construction, a first part 40*a* thereof engaging the piezoelectric actuator 46, a second part 40*b* of the piston 40 acting to guide the spring 48. A seal of the type described hereinbefore with reference to FIGS. 1*a*, 1*b*, 2*a* and 2*b* is sandwiched between the first and second parts 40*a*, 40*b* of the piston 40, the seal member 12 of the seal engaging the wall of the bore 42 to substantially prevent fluid from escaping from the control chamber 38, in use.

In use, with fuel under high pressure applied to the bore of the nozzle body 36, and with the actuator 46 occupying a position in which the axial length thereof is relatively great, the fluid pressure within the control chamber 38 in conjunction with the action of the spring 48 is sufficient to ensure that the needle 34 is unable to lift from its seating under the action of the fuel pressure applied to the thrust surfaces thereof. In order to commence injection, the actuator 46 is de-energized to reduce its length, thus permitting the piston 40 and the seal to move in an upward direction in the orientation illustrated, thus reducing the fluid pressure within the control chamber 38, and hence reducing the magnitude of the downward force applied to the needle 34. The reduction in the magnitude of the downward force applied to the needle 34 will subsequently reach a point beyond which the fuel pressure acting upon the thrust surfaces of the needle 34 is sufficient to lift the needle 34 from its seating. In order to terminate injection, the actuator 46 is energized and returned to substantially its original length. As a result, the piston 40 and seal return to substantially their original positions, re-pressurizing the fluid within the control chamber and increasing the magnitude of the downward forces applied to the needle 34 to an extent sufficient to cause the needle 34 to move into engagement with its seating.

Figure 8:
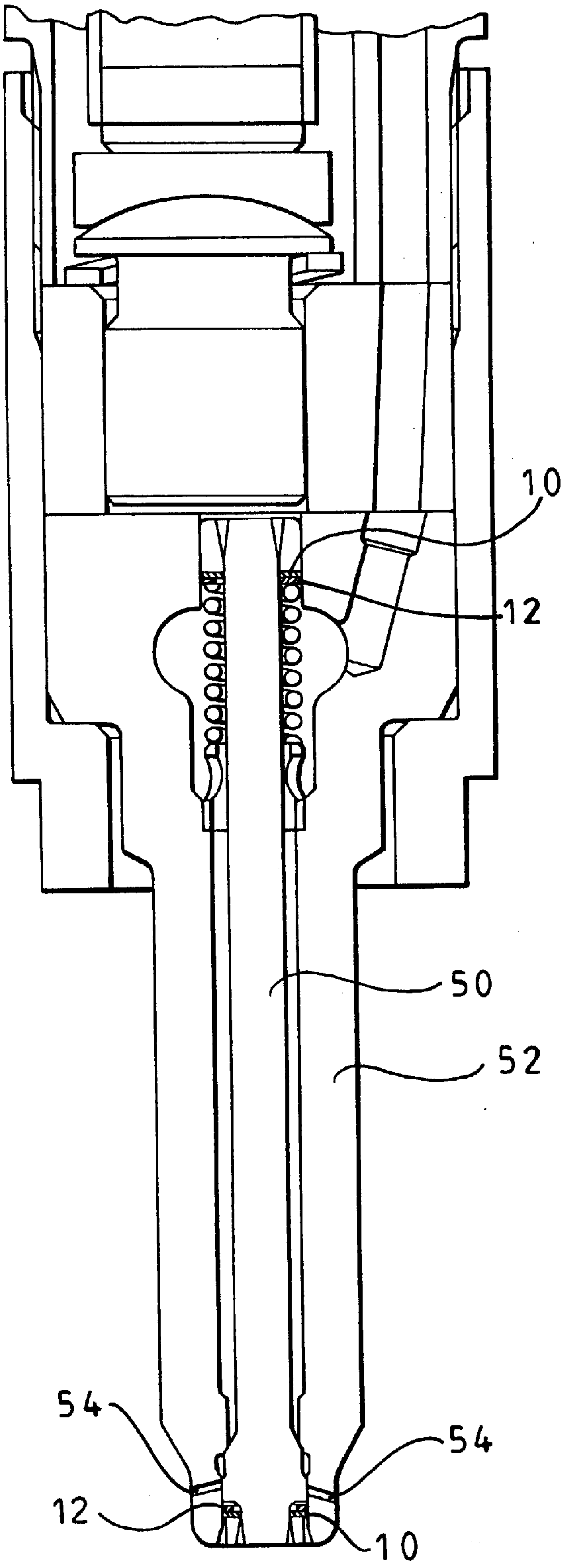
FIG. 8 is a view illustrating part of another fuel injector which incorporates the seal of FIGS. 5*a* and 5*b;*

FIG. 8 illustrates an alternative type of injector, the injector comprising a needle 50 slidable within a bore formed in a nozzle body 52. The injector is of the outwardly opening type, downward movement of the needle 50, in the orientation illustrated, causing the needle 50 to lift from a seating, and permitting fuel to flow to one or more outlet openings 54 provided adjacent the lower end of the nozzle body 52. The upper and lower ends of the needle 50 are of diameter substantially equal to the diameter of the adjacent parts of the bore of the nozzle body 52 and serve to guide the needle 50 for sliding movement, and in order to provide a substantially fluid tight seal between the needle 50 and these parts of the bore, seals of the type described hereinbefore with reference to FIGS. 5*a* and 5*b* are carried by the needle 50.

It will be appreciated that in any of the applications described hereinbefore, if a single one of the seals is insufficient to produce the desired level of sealing, several of the seals may be stacked, one upon another, to improve the level of sealing achieved, and to increase the fuel pressure which can be withstood by the seal.

If, in use, high sliding velocities are likely to be encountered and/or extremely high pressures have to be withstood, then the seal member and/or the wall of the bore may be coated with a hard coating such as titanium nitride, carbon-tungsten carbide or diamond-like carbon to reduce wear and reduce the risk of the seal member becoming welded to the wall of the bore.

Figure 9:
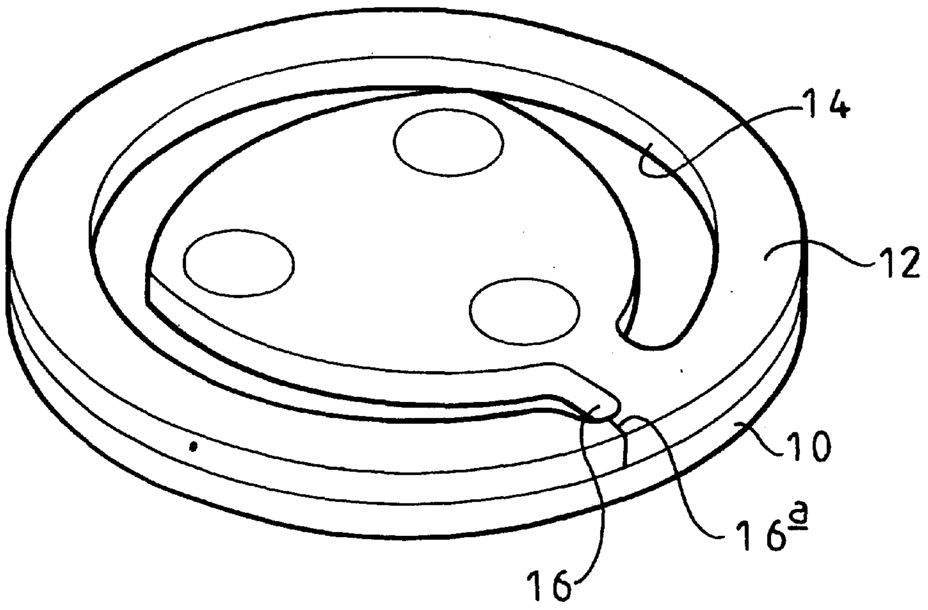
FIG. 9 is a perspective view illustrating an alternative seal.
Figure 10:
FIG. 10 is a side view of the seal of FIG. 9.

FIGS. 9 and 10 illustrate a seal which, in many respects, is identical to that of FIG. 1. The main difference between the arrangement of FIGS. 9 and 10 and that of FIG. 1 result from the manner in which the seal is constructed. In the arrangement of FIGS. 9 and 10, a resilient seal member 12 is secured to a support member 10. The seal and support members 10, 12 are, initially, of substantially equal diameter and extend substantially coaxially. The seal and support members 10, 12 are conveniently secured to one another using a welding technique.

As with the arrangement of FIG. 1, the seal member is provided with a part circular slot 14 which opens into a generally radially extending slot 16. The slot 16 does not, however, extend to the periphery of the seal member 12. As a result, the seal and support members 10, 12 have continuous peripheral surfaces which can be ground, if necessary, to the correct diameter for the application in which the seal is to be used. The alignment, diameter tolerance, roundness and surface finish can therefore be improved compared to the arrangement of FIG. 1.

Figure 11:
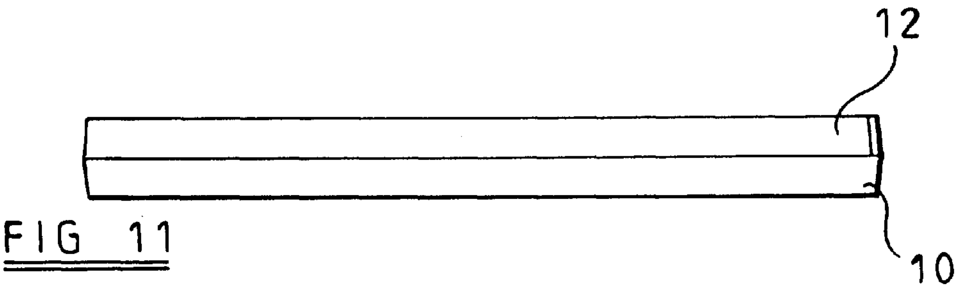
FIG. 11 is a view similar to FIG. 10 illustrating a modification.

As illustrated in FIG. 10, the seal and support members 10, 12 are machined such that they are of cylindrical form. Alternatively, as shown in FIG. 11, these components may be ground to be of barrelled or part-spherical form thereby reducing friction between the seal and the wall of the bore in which the seal is located, in use, and providing improved tolerance to misalignment.

Figure 12:
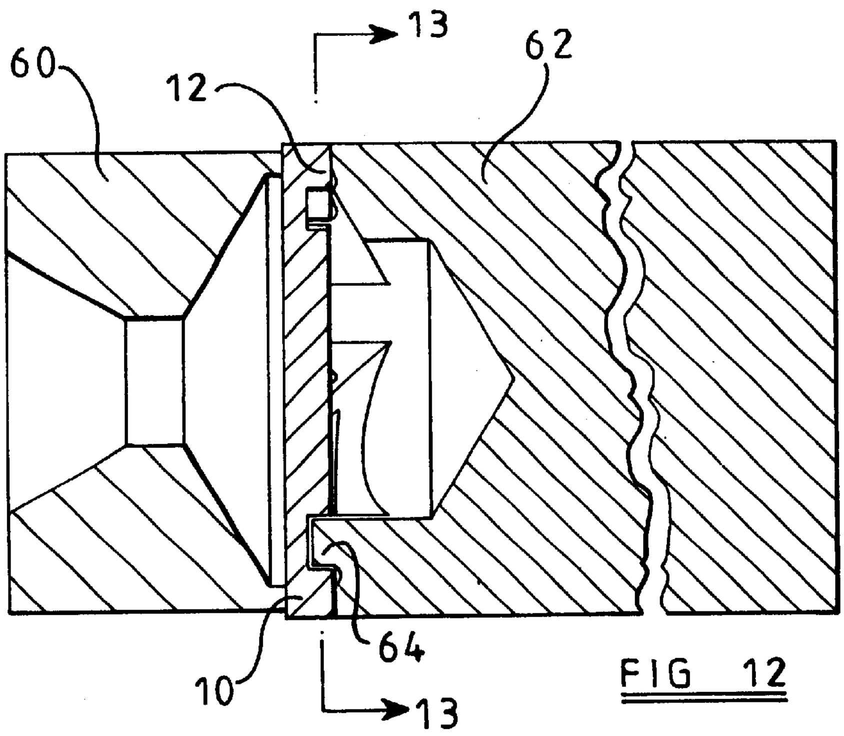
FIGS. 12 and 13 illustrate an apparatus for use in manufacture of the seals of FIGS. 9 to 11.
Figure 13:
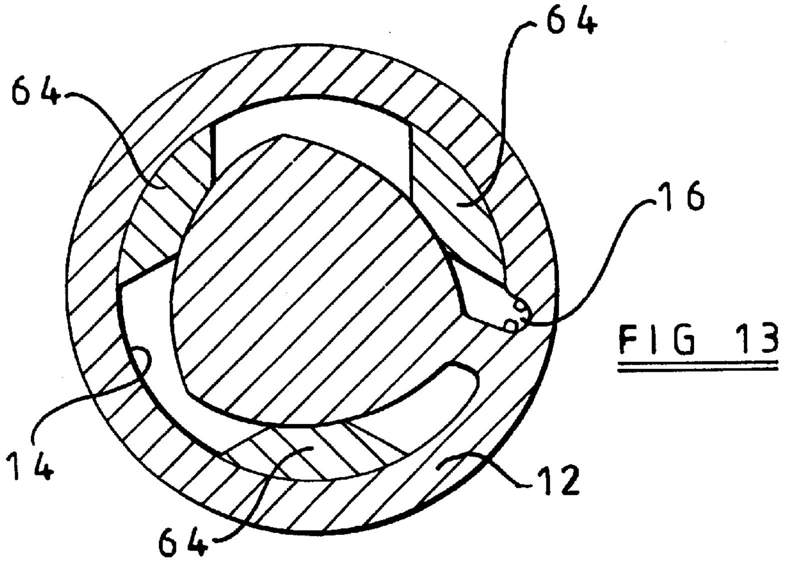

The grinding step is conveniently achieved by supporting the seal between first and second tools 60, 62 (see FIGS. 12 and 13) the second tool 62 including protruding legs 64 which are received within the slot 14. The cooperation between the legs 64 and the seal member 12 holds. the seal securely and coaxially relative to the tools 60, 62 and permits the seal to be rotated during the grinding operation.

After the grinding operation has been completed, the seal member 12 is deformed to increase its outer diameter, the deformation resulting in the seal member 12 fracturing as denoted at 16*a* such that the slot 16 opens, through the fracture, to the periphery of the seal member 12. The tensile stresses introduced into the seal member 12 by the grinding operation will tend to cause the seal member 12 to spring outwardly such that, in a relaxed condition, it is of diameter slightly greater than the support member 10 and such that the seal and support members 10, 12 are eccentric to one another.

The deformation step may be achieved by locating the seal within a bore provided in a housing and applying fluid under pressure to the slot 14. As a result, an outwardly directed force is applied to the outer part of the seal member 12. The fluid pressure is chosen to be sufficiently high to cause the seal member 12 to fracture whereon the seal member 12 will spring outwardly as described hereinbefore.

If the bore is of sufficient diameter, then the fluid under pressure will cause the seal member 12 to move beyond a position in which the yield stress of the part of the seal member 12 adjacent the slot 14 is exceeded assisting the tensile surface stresses induced during grinding in ensuring that, when relaxed, the seal member 12 is of increased diameter.

The method described hereinbefore is advantageous in that, in use, the slot 16 is almost closed thus the risk of leakage past the seal is reduced.

The manufacturing technique described hereinbefore may be used with others of the seal embodiments described hereinbefore.

What is claimed is:

1. A seal comprising a support member having an outer periphery of substantially circular form, and a resilient seal member member including a region of split ring form, the seal member, when occupying a relaxed condition, having an outer periphery of generally circular form and a diameter greater than that of the support member, the seal member being mounted upon and secured to the support member such that the outer periphery of the seal member is in alignment with the outer periphery of the support member adjacent to the region of split ring form, the seal member and support member being eccentric to one another when the seal member occupies the relaxed condition, the seal member being compressible towards a compressed condition in which the seal member and the support member are of substantially equal diameter and are substantially coaxial.

2. A seal as claimed in claim 1, wherein the region of split ring form comprises an annular part of the seal member which is broken, at least in part, by a slot.

3. A seal as claimed in claim 1, wherein the region of split ring form comprises an annular part of the seal member which is broken, at least in part, by a fracture.

4. A seal as claimed in claim 1, further comprising a cover member, the seal member being located between the support member and the cover member.

5. A high pressure fuel pump comprising a pumping plunger reciprocable within a bore under the influence of a cam arrangement, and a seal as claimed in claim 1 carried by the pumping plunger, the seal member of the seal engaging the wall of the bore, the seal being arranged to substantially prevent fuel from flowing between the pumping plunger and the wall of the bore when the pumping plunger moves in a first direction.

6. A fuel injector comprising a valve needle slidable within a bore, a control chamber for receiving fuel, a surface associated with the needle being subject to fluid pressure within the control chamber defined, in part, by a piston slidable within a further bore, and a seal as claimed in claim 1 associated with the piston to restrict the escape of fluid from the control chamber between the piston and the bore within which the piston is slidable.

7. A fuel injector comprising a valve needle slidable within a bore, the needle carrying a seal as claimed in claim 1 located so as to restrict leakage between the needle and the wall of the bore.

8. A method of manufacturing a seal comprising the steps of initially securing a seal member having a substantially circular outer periphery to a support member having a substantially circular outer periphery such that the seal and support members are substantially coaxial and, following the step securing the seal member to the support member, fracturing the seal member to provide a region of split ring form, the outer periphery of the seal member thereby being in alignment with the outer periphery of the support member adjacent to the region of split ring form, and deforming the seal member to increase its diameter such that the seal member is eccentric to the support member after deformation.

9. A method as claimed in claim 5, further comprising a step of grinding the seal prior to the step of deforming the seal member.

10. A method as claimed in claim 8, wherein the seal member is provided with an arcuate slot, the step of deforming the seal member including the step of fracturing the seal member radially outwardly of the slot.

11. A method as claimed in claim 10, wherein the step of deforming the seal member comprises applying fluid under pressure to the slot.

* * * * *